(12) United States Patent
Gruber et al.

(10) Patent No.: US 9,049,607 B2
(45) Date of Patent: Jun. 2, 2015

(54) METHOD AND TEST EQUIPMENT FOR AUTOMATICALLY INITIALIZING A MOBILE STATION DURING A TEST

(71) Applicant: Rohde & Schwarz GmbH & Co. KG, Munich (DE)

(72) Inventors: Ingo Gruber, Munich (DE); Roman Elias, Munich (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 14/057,977

(22) Filed: Oct. 18, 2013

(65) Prior Publication Data

US 2014/0113625 A1 Apr. 24, 2014

Related U.S. Application Data

(60) Provisional application No. 61/715,986, filed on Oct. 19, 2012.

(51) Int. Cl.
*H04W 24/00* (2009.01)
*H04W 60/04* (2009.01)
*H04W 24/06* (2009.01)

(52) U.S. Cl.
CPC ............. *H04W 24/00* (2013.01); *H04W 60/04* (2013.01); *H04W 24/06* (2013.01)

(58) Field of Classification Search
CPC ...................................... H04W 60/04
USPC ................. 455/435.1, 435.2, 435.3; 370/332
See application file for complete search history.

(56) References Cited

U.S. PATENT DOCUMENTS

2011/0090872 A1* 4/2011 Dahlen et al. ................. 370/332

FOREIGN PATENT DOCUMENTS

DE 103 34 127 A1 2/2005
EP 1 501 324 A1 1/2005

* cited by examiner

*Primary Examiner* — Phuoc H Doan
(74) *Attorney, Agent, or Firm* — Ditthavong & Steiner, P.C.

(57) ABSTRACT

A method automatically initializes a mobile station during a test between a mobile station and test equipment emulating a single cell of a cellular mobile communication system, wherein the mobile station is initially registered to the cell having a first location area code. First, radio transmission into the cell is terminated by the test equipment. Then, radio transmission is restarted into the cell, but now having a second location area code, wherein the second location area code is different than the first location area code, forcing the mobile station to perform a registration procedure to the cell.

7 Claims, 3 Drawing Sheets

METHOD AND TEST EQUIPMENT FOR AUTOMATICALLY INITIALIZING A MOBILE STATION DURING A TEST

BACKGROUND OF THE INVENTION

The present invention relates to a method of automatically initializing a mobile station during a test between the mobile station and the test equipment emulating a single cell of a cellular mobile communication system and a method of automatically performing a sequence of tests.

Mobile stations for cellular mobile communication systems have to pass a wide range of tests before making the mobile station available to the consumer market. Those tests verify e.g. the conformance to specified frequency ranges or the conformance to specified protocols for the mobile communication system as well as tests to evaluate the acceptance of the mobile station by the end user.

Preferably, all these tests shall be conducted automated and under pre-defined dedicated initial conditions to achieve deterministic results. It is of high importance that each test is independent and not influenced by the previous test of the mobile station. To achieve this, not only the cell emulated by a test equipment has to be re-initialized before each test, but also the mobile station. Initializing or re-initializing the mobile station means that the internal memory of the mobile station storing information about the previous radio link and mobile management parameters are deleted and/or set to a dedicated, pre-determined initial value.

Especially in test series with a large number of subsequently performed tests, a radio cell is established with each new test and the mobile station registers to this cell. The mobile station stores internally information of the cell it was previously registered to enabling a fast contact to the cell after a loss of the radio link.

In a test environment for performing a series of tests the emulated cell is always the same in terms of frequency, modulation and e.g. also in terms of broadcasted network identification. In this case, the mobile station assumes that this is always the same cell. In consequence the results of a test case may depend on the test results of the previously performed tests. This problem is only solved by a re-initialization of the mobile station before each test case.

Usually this re-initialization is achieved by a reboot of the mobile station. However, such a reboot is very time consuming, especially for sophisticated smart phones. An automatically processing of a reboot is elaborate and laborious. In some cases it is even required to apply special devices to perform this reboot or to perform tests manually.

In DE 103 34 127 A1 a remote controlled reboot function of a mobile station is described. The disclosed mobile station comprises a dedicated switch-on/off unit and a remote control unit. The remote control unit is connected to a command interface to receive remote control commands. A test equipment contains software to establish a connection independent of the radio interface of an emulated mobile communication system to communicate to the remote control unit of the mobile station. On receipt of a switch-off command a switched-on mobile station is switched-off by the switch-on/off unit of the mobile station invoking e.g. a standardized so called AT command. In the same way, a reboot of the mobile station can be initiated by sending a combined command to switch off and subsequently automatically switch on the mobile station.

This has the disadvantage that such a remote control unit has to be additionally implemented into each mobile station under test. Further on, some type of mobile stations do not support such a standardized set of commands to control a mobile station, e.g. to switch it off or to switch it on.

Therefore it is the object of the present invention to provide a method that resets the internal memory of a mobile station into a dedicated initial state, especially with regard to stored information about radio link functionalities exchanged in network protocols according the layer 1 to 3 of the OSI reference model of the emulated cellular mobile communication system.

A further object is to provide a method to automate the performance of a sequence of consecutive tests of a test series.

SUMMARY OF THE INVENTION

The present invention comprises a method of automatically initializing a mobile station during a test between a mobile station and a test equipment emulating a single cell of a cellular mobile communication system, wherein the mobile station is initially registered to the cell having a first location area code, with subsequent steps. First, radio transmission into the cell is terminated by the test equipment. Then, radio transmission is restarted into the cell, but now having a second location area code, wherein the second location area code is different to the first location area code, forcing the mobile station to perform a registration procedure to the cell.

The invention is based on the effect that the lower layer of the protocol of a mobile station are not only reset into a dedicated initial state by a reboot of the mobile station, but also by registration of the mobile station into a cell of yet unknown location area, i.e. a radio cell broadcasting a yet unknown location area code.

This is also used to solve the object to perform a series of tests automatically especially with an initialized mobile station at the beginning of each single test. The inventive method of automatically performing a test series of subsequent tests between the mobile station and the test equipment emulating one single cell of a cellular mobile communication system with a mobile station initialized for each test comprises the steps of creating a cell with a first location area code and performing a test with the mobile station registered in the cell. When the test is finished the next step is terminating the radio transmission to the cell by the test equipment. After that the cell is recreated by restarting radio transmission to the cell, but now having a second location area code. It is now proceeded with the step of performing a test until the last test is performed.

By terminating the radio transmission at the end of one test and recreating the cell broadcasting a different location area code, the mobile station is forced to register into this cell and in doing so performing signaling procedures of the complete lower protocol layers 1, 2 and 3 of the mobile communication system. The mobile station is reset into a dedicated and well defined state. This process is called here the re-initialization of a mobile station.

This has the advantage that the test series can be performed without any interruption in terms of manual interaction with the mobile station itself, e.g. to perform an initialization of the mobile station which is so far only attained by rebooting the mobile station.

The dependent claims contain further developments of the invention.

In a preferred embodiment of both methods the termination of the radio transmission into the cells is performed by shutting down the cell. This guarantees that the complete radio link is torn down. The time required for a complete shutdown is long enough to ensure that all timers in the mobile station waiting for radio signals from the test equipment including radio cell information are expired and consequently the mobile station automatically initiates and performs a registration procedure with the cell and test equipment respectively.

It is further a preferred embodiment performing an initialization of the test equipment at the beginning of each test of the test series. This ensures that also the emulating radio cell is in a dedicated and therefore initialized state.

Furthermore, it is preferred to establish a data connection between the cell and the mobile station after the first registration of the mobile station to the cell. This facilitates the automatic performance of a test series especially of the tests of data communication. During the registration procedure only the layer 1 to 3 of the mobile communication system protocols are reset, but not the upper layers especially layers 6 and 7, concerning application services, remaining data connections, especially IP connection established. Therefore a data connection has to be set up only once at the beginning of the test series and can be reused until it is actively released, e.g. after finishing the last test.

BRIEF DESCRIPTION OF THE DRAWINGS

An embodiment of the invention is described hereafter by way of example only. It should be noted that the invention is not limited to this embodiment. In the drawings

DETAILED DESCRIPTION OF THE INVENTION

Figure 1:
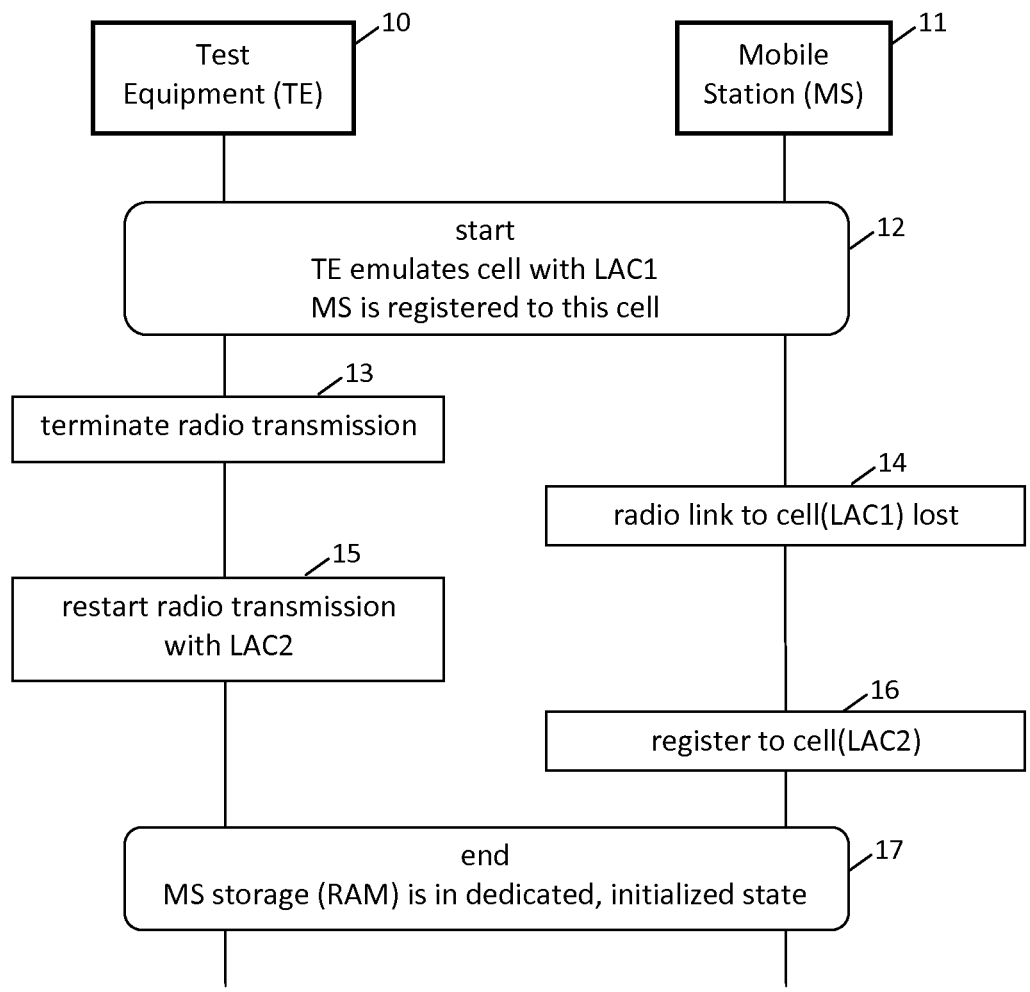
FIG. 1 illustrates an exemplary embodiment of the inventive method of initializing a mobile station during a test as a flow chart.

FIG. 1 illustrates the steps of the inventive method as a flow chart. The method is performed between a test equipment 10 which emulates a radio cell of a cellular mobile communication system. All steps performed by the test equipment are listed on the left hand side in chronological order with increasing time in downward direction. The action performed by a mobile station 11 are listed in chronological order on the right hand side and also chronologically with respect to the steps of the test equipment.

The test equipment 10 emulates one single cell providing all signaling messages exchanged with a mobile station 11 to perform the tested functionality according to the mobile communication standard. In a cellular system each cell belongs to one location area and broadcasts one dedicated location area code identifying this location. If a mobile station 11 was registered to a cell of a first location area and moves into a cell of a new location area broadcasting a different location area code, a registration procedure to the new location area is initiated automatically by the mobile station.

The initialization of the mobile station 11 during a test starts at step 12 with a situation in which terminal equipment 10 emulates a cell broadcasting a location area code one (LAC1). The mobile station 11 is registered to this cell. In the first step 13 the test equipment terminates the radio transmission. In consequence, see step 14, the mobile station 11 loses the radio link to the cell. A mobile station 11 periodically monitors the frequency of channels of the mobile communication system for active radio links. In the next step 15, the test equipment 10 restarts transmitting radio signals, but broadcasts now a location area code two (LAC2) which is different to the previously broadcasted location area code 1 (LAC1).

These radio signals are detected by the mobile station 11. As the detected location area code is different to the stored location area code of the previous cell a registration procedure is initiated automatically by the mobile station 11, see step 16. During this registration procedure all parameters associated to the lower layers of the mobile communication system's protocol stack, which are layers 1-3 according to the OSI model, are passed and the according parameter stored in the mobile station 11 are set to a dedicated value and therefore are re-initialized. The initialization process ends in step 17 with the mobile station (11) being in a dedicated, initialized state.

Figure 2:
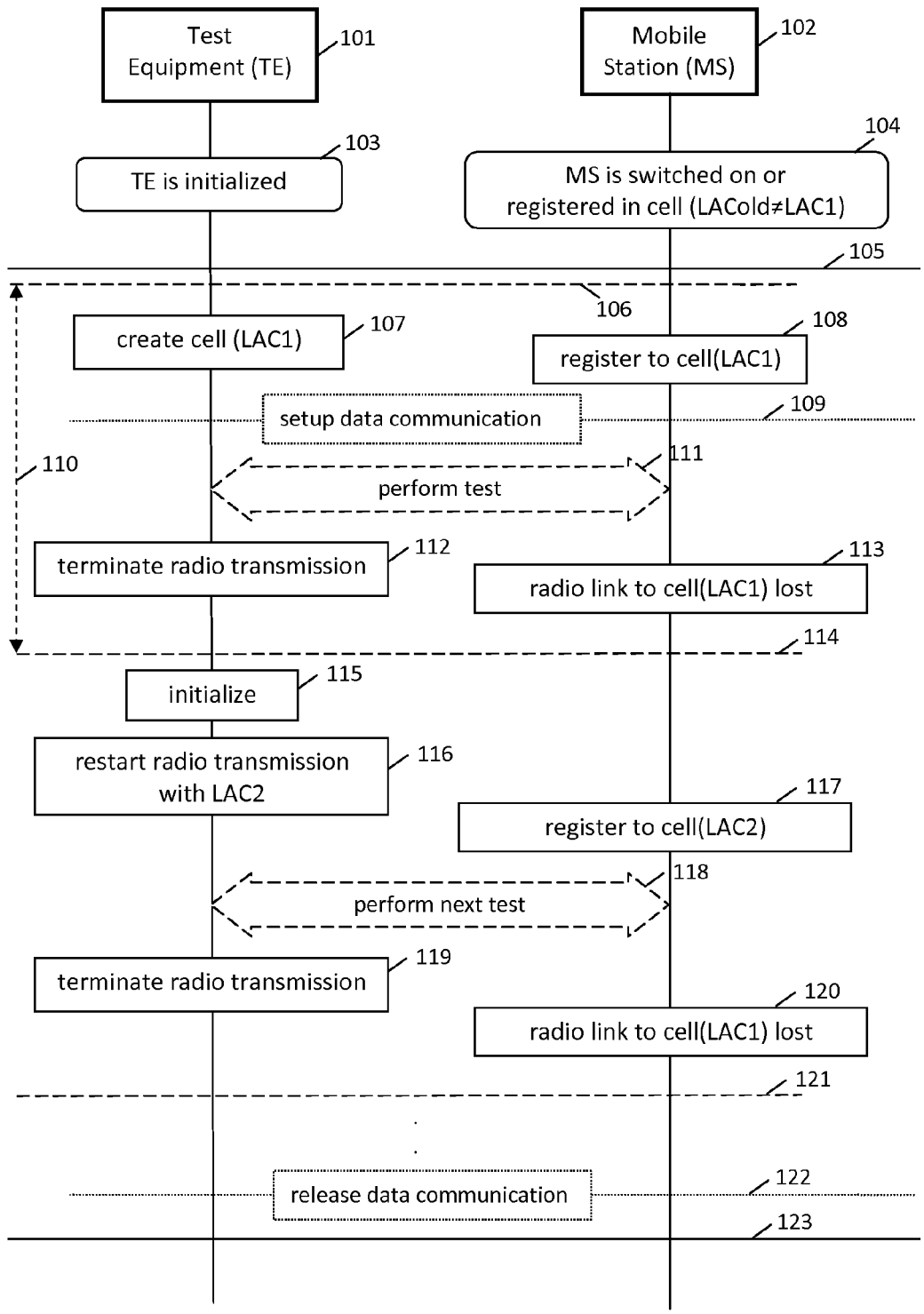
FIG. 2 illustrates an exemplary embodiment of the inventive method of automatically performing a test series as a flow chart.

FIG. 2 illustrates a method to perform a test series between a test equipment 101 and a mobile station 102 applying the initialization method described above. The test series comprises a sequence of single tests which have to be performed one after the other between the one single cell emulated by the test equipment and the mobile station 102 under test. Each single test has to be performed in a dedicated initial environment and configuration with respect to the simulated test cell, as well as with respect to the mobile station 102. This means before each single test is started the test equipment 101 as well as the mobile station 102 have to be initialized, i.e. set into a dedicated state. Such a test series can be automatically performed without any manual interaction of a test operator manipulating neither test equipment 101 nor the mobile station 102 when performing the following described steps.

Before the test series starts, indicated by the solid line 105, the test equipment 101 is initialized, see step 103.

The mobile station 102 is switched on or it is registered into a cell with a location area code different to the preceding location area code 1, see step 104.

In the following the first two tests of a test series are described as an exemplary embodiment. It is assumed that a test series is performed with an active data connection. This is only one of a large number of possible test scenarios. The method is not restricted to this test series.

The start of the first test is marked by the dash line 106. As a first step 107, the test equipment 101 creates a cell with a location area code 1. In step 108, the mobile station 102 registers to this cell. During this registration the signaling procedures of layers 1-3 of the protocol stack are performed. In the next step 109, a setup of data communication is requested and established. This request of a data communication is performed either automatically, automated or initiated manually by an operator.

Now the actual test is performed, see step 111. When the test procedure is finished the radio transmission is terminated by the test equipment, see 112. The mobile station 102 has no longer a radio link to cell with location area code 1. The termination radio transmission can be achieved e.g. by completely switching off the transmitter of the test equipment 101 and therefore tearing down the cell. Alternatively, the radio link could be interfered by an interference signal or noise with an intensity higher than the intensity of the signal of the cell. A further possibility is to block the radio transmission by a physical device, for example a barrier of metallic material. The first test ends here, see arrow 110.

The next test case starts at dashed line 114 with the initialization of the test equipment 101, see step 115. The next test scenario can be up loaded to the test equipment 101. The test can apply e.g. different radio channel property, like different fading, and/or comprise different functionalities to be test. Before the actual test starts, see step 118, the test equipment 101 restarts radio transmission 116 broadcasting now a location area code 2 different to the location area code 1 used in the previous test 110. In consequence, the mobile station 102 registers to the new cell 117 having location area code 2.

As only signaling procedures and parameter of the lower protocol stacks are performed during registration, the mobile station 102 remains in a connected mode to the data communication and resumes to that state in the new test. After completion of the next test 118, the test equipment 101 again terminates the radio transmission 119 with the consequence that the mobile station 102 loses the radio link to the cell with LAC1, see step 120. The second test is finished, marked by dash line 121. Further tests can be performed applying the steps 115 to 120 until the last test is completed as long as the data communication is not actively released with step 122.

Figure 3:
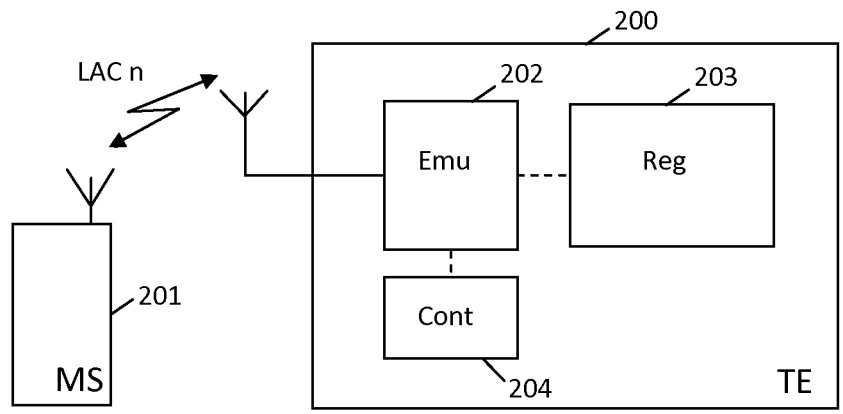
FIG. 3 illustrates an exemplary embodiment of the inventive test equipment initializing a mobile station in a test as a block diagram.
Figure 4:
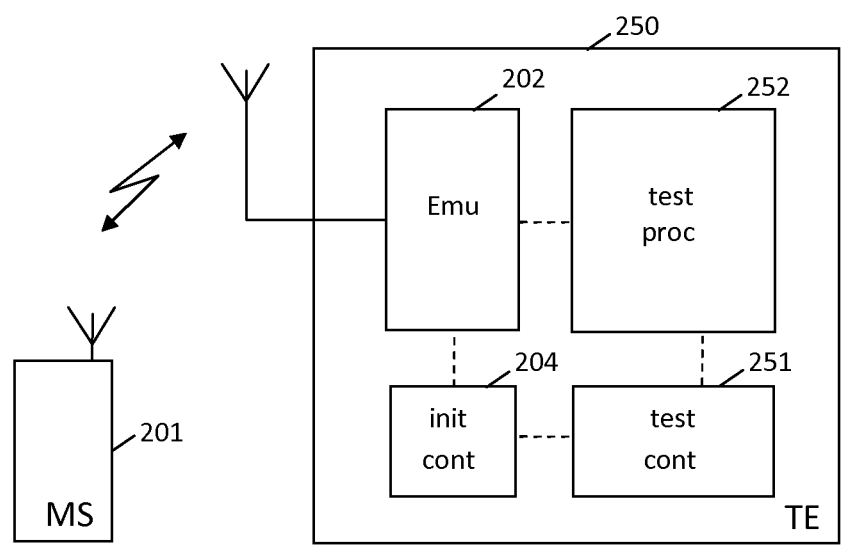
FIG. 4 illustrates an exemplary embodiment of the test equipment performing a test series as a block diagram.

FIG. 3 and FIG. 4 illustrate test equipment 200, 250 with means to run a computer program performing all of steps for automatically initializing a mobile station during a test and to perform automatically a test series initializing the mobile station according to the method illustrated in FIG. 1 and FIG. 2. Also a digital storage medium with electronically readable control signals can be applied to the test equipment 200, 250 performing all steps of above described methods.

In FIG. 3 illustrates the test equipment 200 constructed to perform a test with automatically initializing the mobile station 201 under test. It comprises a cell emulator 202 emulating a cell of a cellular mobile communication system transmitting and receiving signals 205 via at least one antenna to a mobile station 201 under test. The emulation means 202 are connected to registration means 203 and to initialize controller 204. When the mobile station 201 initiates registration to the cell the according signals are received by the cell emulator 202 and are forwarded to a registration means 203 to perform all signaling procedures for this. The initialization controller 204 controls the termination of the radio link of the cell with the location area code 1, the duration of no transmission, and the restarting of radio transmission into the same cell but now broadcasting a second location area code different to the first location area code of the previous cell. The initialization controller 204 can be activated e.g. by a command of the test processor, not depicted here.

FIG. 4 illustrates a test equipment 250 which performs a test series including automatic initialization of the mobile station 201 at the beginning of each single test. The cell emulator 202 emulates a single cell of a cellular communication system including a location area code which is broadcasted on a dedicated schedule via a control channel into the cell. The cell emulator 202 is in connection with the test processor 252. The test processor 252 is constructed to perform all steps and signaling procedures during each single test. A test controller 251 is connected to the test processor 252 and schedules the test sequence and controls the test processor to performed one test after the other until the last test is performed.

An initialization controller 204 is connected to the test controller 251 and to the cell emulator 202. Optionally the initialization controller 204 can also be integrated into the test controller 251. When the procedures of a single test are finished the test controller 251 instructs the initialization controller 204 to perform an initialization of the mobile station. Then the initialization controller 204 instructs the cell emulator 202 to terminate the radio transmission into the cell and, after some time has passed, to recreate the cell by restarting radio transmission into the cell, but now broadcasting a second location area code different to the first location area code into the cell.

The invention is not limited to the described examples. The invention also comprises all combinations of any of the claimed or described or depicted features.

The invention claimed is:

1. A method of automatically performing a series of subsequent tests between a mobile station and test equipment emulating one single cell of a cellular mobile communication system with the mobile station initialized for each test, comprising:
   i. creating the cell with a first Location Area Code,
   ii. performing a test with the mobile station registered in the cell,
   iii. terminating radio transmission into the cell by the test equipment,
   iv. recreating the cell by restarting radio transmission into the cell having a second Location Area Code different than the first Location Area Code, and
   v. proceeding with step ii. by performing a next test until a last test is performed,
   wherein the mobile station is switched on before the cell with the first Location Area Code is created or if the second Location Area Code is different than the first Location Area Code of the cell, the mobile station was registered beforehand.

2. The method of claim 1 wherein
terminating radio transmission into the cell is performed by shutting down the cell.

3. The method of claim 1 wherein
terminating radio transmission into the cell is performed by an interference signal or noise transmitted with an intensity higher than the intensity of the signal of the cell.

4. The method of claim 1 wherein
terminating radio transmission into the cell is performed by blocking the radio transmission by a physical device, especially by a barrier of metallic material.

5. The method of claim 1 further comprising:
performing an initialization of the test equipment after terminating the radio transmission.

6. The method of claim 1 further comprising:
establishing a data connection between the cell and the mobile station after a first registration of the mobile station to the cell.

7. A test equipment performing a test series between a mobile station and the test equipment and emulating one single cell of a cellular mobile communication system with automatically initializing the mobile station at each subsequent test of the test series, comprising:
   a cell emulator for creating the cell with a first Location Area Code,
   a test processor connected to the cell emulator for performing a test with the mobile station registered in the cell, and
   a test controller instructing the cell emulator
      for terminating radio transmission into the cell by the test equipment,
      then recreating the cell by restarting radio transmission into the cell with a second Location Area Code different than the first Location Area Code, and
      for initiating the test processor to perform a next test until a last test is performed,
   wherein the mobile station is switched on before the cell with the first Location Area Code is created or if the second Location Area Code is different than the first Location Area Code of the cell, the mobile station was registered beforehand.

* * * * *